US009113543B2

(12) United States Patent
Brinkmann et al.

(10) Patent No.: US 9,113,543 B2
(45) Date of Patent: Aug. 18, 2015

(54) DEVICE AND USE OF THE DEVICE FOR MEASURING THE DENSITY AND/OR THE ELECTRON TEMPERATURE AND/OR THE COLLISION FREQUENCY OF A PLASMA

(75) Inventors: Ralf Peter Brinkmann, Erkrath (DE); Jens Oberrath, Bochum (DE); Peter Awakowicz, Bochum (DE); Martin Lapke, Hamburg (DE); Thomas Musch, Bochum (DE); Thomas Mussenbrock, Wuppertal (DE); Ilona Rolfes, Bochum (DE); Christian Schulz, Bochum (DE); Robert Storch, Bochum (DE); Tim Styrnoll, Bochum (DE); Christian Zietz, Hannover (DE)

(73) Assignee: RUHR-UNIVERSITÄT BOCHUM, Bochum (DE)

( * ) Notice: Subject to any disclaimer, the term of this patent is extended or adjusted under 35 U.S.C. 154(b) by 190 days.

(21) Appl. No.: 13/821,184

(22) PCT Filed: Oct. 6, 2011

(86) PCT No.: PCT/DE2011/001802
§ 371 (c)(1),
(2), (4) Date: Mar. 6, 2013

(87) PCT Pub. No.: WO2012/045301
PCT Pub. Date: Apr. 12, 2012

(65) Prior Publication Data

US 2013/0160523 A1 Jun. 27, 2013

(30) Foreign Application Priority Data

Oct. 6, 2010 (DE) ......................... 10 2010 047 467
Dec. 23, 2010 (DE) ......................... 10 2010 055 799

(51) Int. Cl.
*G01N 9/00* (2006.01)
*H05H 1/00* (2006.01)
(Continued)

(52) U.S. Cl.
CPC ............. *H05H 1/0037* (2013.01); *H01P 3/085* (2013.01); *H01P 5/10* (2013.01); *H05H 1/0012* (2013.01); *H05H 1/0081* (2013.01)

(58) Field of Classification Search
CPC ........................................................ G01N 9/00
USPC ........... 73/32 R, 30.01; 324/464; 315/111.21, 315/111.51, 111.41
See application file for complete search history.

(56) References Cited

U.S. PATENT DOCUMENTS 4,725,792 A 2/1988 Lampe, Jr.
5,703,488 A * 12/1997 Ohmi et al. .................. 324/464
(Continued)

FOREIGN PATENT DOCUMENTS

DE 1 957 764 3/1967
DE 1 959 243 6/1971
(Continued)

OTHER PUBLICATIONS

International Search Report for PCT/DE2011/0017802, issued Apr. 26, 2012.
(Continued)

*Primary Examiner* — Hezron E Williams
*Assistant Examiner* — Hoang Nguyen
(74) *Attorney, Agent, or Firm* — Henry M. Feiereisen LLC.

(57) ABSTRACT

The invention relates to a device and method for measuring the density of a plasma by determining an impulse response to a high-frequency signal coupled into a plasma. The density, electron temperature and/or collision frequency as a function of the impulse response can be determined. A probe having a probe head and a probe shaft can be introduced into the plasma, wherein the probe shaft is connected to a signal generator for electrically coupling a high-frequency signal into the probe head. The probe core is enclosed by the jacket and has at its surface mutually insulated electrode areas of opposite polarity. A balun is arranged at the transition between the probe head and an electrically unbalanced high-frequency signal feed to convert electrically unbalanced signals into balanced signals.

17 Claims, 5 Drawing Sheets

(51) Int. Cl.
*H01P 3/08* (2006.01)
*H01P 5/10* (2006.01)

(56) References Cited

U.S. PATENT DOCUMENTS

| | | | | |
|---|---|---|---|---|
| 6,339,297 | B1 * | 1/2002 | Sugai et al. | 315/111.21 |
| 6,894,474 | B2 * | 5/2005 | Cox et al. | 324/71.1 |
| 7,878,045 | B2 * | 2/2011 | Brinkmann | 73/32 R |
| 8,779,322 | B2 * | 7/2014 | Holber et al. | 219/121.41 |
| 2002/0047543 | A1 | 4/2002 | Sugai et al. | |
| 2003/0227283 | A1 | 12/2003 | Cox et al. | |
| 2005/0016683 | A1 * | 1/2005 | Kim et al. | 156/345.28 |
| 2009/0133471 | A1 * | 5/2009 | Brinkmann | 73/30.04 |

FOREIGN PATENT DOCUMENTS

| | | |
|---|---|---|
| DE | 7109406 | 1/1972 |
| DE | 695 00 694 | 3/1998 |
| DE | 199 17 037 | 11/2000 |
| DE | 103 02 962 | 8/2004 |
| DE | 10 2006 014 106 B3 | 8/2007 |
| DE | 102009022755 | 12/2010 |
| EP | 0 692 926 | 1/1996 |

OTHER PUBLICATIONS

M. Lapke et al. "The multipole resonance probe: A concept for simultaneous determination of plasma density, electron temperature, and collison rate in low-pressure plasmas", Applied Physics Letters, vol. 93, No. 5, Aug. 4, 2008, p. 051502-1to 051502-3, XP002671307, ISSN: 0003-6951, p. 1, left-handed column, para. 3, fig. 1.

R. Engargiola "Tapered microstrip balun for integrating a low noise amplifier with a nonplanar log periodic antenna", Review of Scientific Instruments, vol. 74, No. 12, Dec. 2003, p. 5197-5200, XP002671308, ISSN: 0034-6748, p. 5197, last paragraph—p. 5198, para. 1, fig. 1, 3a.

C. Schulz et al "The multipole resonance probe: Realization of an optimized radio-frequency plasma probe on active plasma resonance spectroscopy", 2010 IEEE Middle East Conference on Antennas and Propagation (MECAP), Oct. 20-22, 2010, p. 1-5 XP002671309, DOI: 10.1109/MECAP.2010.5724175, ISBN: 978-1-61284-903-4, p. 3, right-hand column, para 1, fig. 6.

M. Lapke et al. "Usage of electromagnetic modeling of the multipole resonance probe", 30$^{th}$ ICPIG, Belfast, UK, Aug. 28-Sep. 2, 2011, Sep. 9, 2011: p. 1-4, XP002671310, http://mpserver.pst.gub.ac.uk/sites/icpig2011/180_B6_Lapke.pdf, retrieved Mar. 12, 2012, the whole document.

Magnetic fluctuation probe design and capacity pickup rejection C. M. Franck, O. Grulke, T. Klinger Review of Scientific Instruments (Impact Factor: 1.6). Jan. 2002 DOI: 10.1063/1.1512341 Source: OAI (C) 2002 American Institute of Physics.

Tapered microstrip balun for integrating a low noise amplifier with a nonplanar log periodic antenna Published in Review of Scientific Instruments (vol. 74 , Issue: 12 ) Date of Publication: Dec. 2003 pp. 5197-5200 ISSN: 0034-6748 Digital Object Identifier :10.1063/1.1622975 Date of Current Version :Jun. 18, 2009 Issue Date :Dec. 2003 Publisher: AIP © 2003 American Institute of Physics.

The multipole resonance probe: a concept for simultaneous determination of plasma density, electron temperature, and collision rste in low-pressure plasmas; M. Lapke, T. Mussenbrock, R. P. Brinkmann Applied Physics Letters (Impact Factor: 3.79). Aug. 2008; 93(5):051502-051502-3. DOI: 10.1063/1.2966351.

* cited by examiner

DEVICE AND USE OF THE DEVICE FOR MEASURING THE DENSITY AND/OR THE ELECTRON TEMPERATURE AND/OR THE COLLISION FREQUENCY OF A PLASMA

CROSS-REFERENCES TO RELATED APPLICATIONS

This application is the U.S. National Stage of International Application No, PCT/DE2011/001802, filed Oct. 6, 2011, which designated the United States and has been published as International Publication No. WO 2012/045301 and which claims the priority of German Patent Application, Serial No. 10 2010 047 467.3, filed Oct. 6, 2010, and German Patent Application, Serial No. 10 2010 055 799.4, filed Dec. 23, 2010, pursuant to 35 U.S.C. 119(a)-(d).

BACKGROUND OF THE INVENTION

Device and use of the device for measuring the density and/or the electron temperature and/or the collision frequency of a plasma.

Plasmas—electrically activated gases—are used in various technical areas, wherein the particular physical properties of plasmas frequently form the basis for innovative products and processes. Essential for the success of a method based on the use of technological plasmas is the accurate monitoring and—in case of deviations—eventual readjustment of the plasma state. An important characteristic quantity of plasmas is the location-dependent and time-dependent electron density $n_e$, which must be known in order to assess the properties of plasmas. The electron temperature $T_e$ and the collision frequency v also play an important role in the assessment of a plasma. The electron temperature is a measure of the activity of a plasma, the collision frequency provides information about the neutral gas composition and the neutral gas temperature, which are important, for example, for the endpoint detection in etching processes. With technologically used plasmas, the determination of the electron density is especially difficult in the so-called reactive plasmas. Only few processes are compatible with industrial processes, i.e. robust enough against pollution and disturbances without affecting the process to be monitored, with simultaneously low expenditure in the measurement process, in the analysis and with respect to online capability A method suitable for the industrial plasma diagnostics is the plasma resonance spectroscopy. In this method, a high-frequency signal in the gigahertz range is injected into the plasma. The signal reflection is measured as a function of the frequency. Specifically, the resonances are measured as maxima in the absorption. The position of these maxima is a function of the desired central plasma parameter, the electron density, which can at least in principle be determined in this way absolute and without calibration. The shape of the impulse response and the damping of the maxima, respectively, is a function of the electron temperature and the collision frequency, thus allowing conclusions to be drawn about the other characteristic quantities of the plasma. Compared to standard plasma diagnostics, high-frequency measurements have little to no effect on the technical process and are largely insensitive to contamination. Therefore, little investment and maintenance are required, so that the plasma resonance spectroscopy is distinguished by an easy system integration as well as the speed of the measurement process and its fundamental online capability.

A disadvantage of the plasma resonance spectroscopy is that the evaluation of the measurement results, i.e. for example to the electron density inferred from the resonance curve, requires a mathematical model. The spatial resolution of the measurement results, i.e. the determination of the characteristic plasma parameters as a function of the position, also requires a special technology.

DE 10 2006 014 106 B3 discloses a device for measuring the density of a plasma, wherein a resonant frequency is determined in response to a high-frequency signal coupled into a plasma and used to calculate the plasma density. The device includes a plasma probe having a probe head in the form of a tri-axial ellipsoid that can be introduced into the plasma and means for coupling a high-frequency into the probe head via a shaft supporting the probe head. The probe head has a jacket and a probe core surrounded by the jacket, wherein the surface of the probe core has mutually insulated electrode regions of opposite polarity. The probe head has in particular the shape of a sphere, wherein the electrode regions have opposite polarity and are arranged parallel to the central transverse plane of the sphere. This probe design has a number of advantages arising from the mathematical concept of the multipole expansion.

The multipole expansion is a method which allows under certain conditions (separable coordinates) to explicitly resolve the mathematical relationships forming the basis for the equivalent circuit by using a formula. This results in an infinite sum representation, wherein however the weight of the higher-order multipole fields that correspond to the higher-order term of the sum decreases rapidly, so that the series can be truncated after only a few terms. Under certain circumstances, only the first sum term is significant, the so-called dipole component. When the ellipsoidal probe head and the wiring of the electrode regions are selected to be symmetrical with respect to a central transverse plane passing through the center, the zero-order sum term, i.e. the so-called monopole component, becomes zero. This leads to a simple and especially unambiguous evaluation rule, which allows the local plasma density to be determined with high accuracy.

However, it has also been shown that electrical coupling of the high-frequency signal via the probe shaft is demanding, since the electrodes have to be driven symmetrically with the high-frequency signal. The symmetrical control requires the feed line to also be electrically symmetrical, so as to eliminate phase shifts due to the routing of the conductors. This requires a relatively sophisticated wiring design for the preferably very small probes, especially for performing a spatially resolved measurement, which is only possible by moving the probe head.

SUMMARY OF THE INVENTION

On this basis, it is the object of the invention to provide a device for measuring certain characteristics of a plasma with a multipole resonant probe which has improved signal transmission compared to the device of DE 10 2006 014 106 B3 and which more particularly enables spatially resolved measurements with greater accuracy.

This object is attained with a device having a probe for insertion into the plasma, with the probe including a probe head with a probe core having mutually isolated electrode regions of opposite polarity and a jacket surrounding the probe core, as well as a balun disposed at a transition between the probe head and an electrically unbalanced high-frequency signal feed. The balun converts electrically unbalanced signals into balanced signals. The device further includes a signal generator connected to the probe shaft and electrically coupling a high-frequency signal into the probe head, and a receiver configured to determine an impulse response to the high-frequency signal coupled by the probe head into the plasma and to calculate from the impulse response the at least one of density, electron temperature and collision frequency of the plasma.

The object is also attained with a method for the measurement of parameters characterizing a plasma with the afore-described device. The method includes inserting the probe into the plasma, connecting a signal generator to the probe shaft and electrically coupling a high-frequency electrically unbalanced signal into the probe head, converting with the balun the electrically unbalanced signal into an electrically balanced signal, coupling with the probe head the electrically balanced signal into the plasma, determining an impulse response to the high-frequency signal coupled into the plasma, and calculating from the impulse response the at least one of density, electron temperature and collision frequency of the plasma.

The device according to the invention for measuring the density and/or the electron temperature and/or the collision frequency of a plasma, i.e. for measuring characteristic values suitable for characterizing a plasma, includes means for determining an impulse response, in particular a resonant frequency, in response to high-frequency signal coupled into a plasma and means for calculating the desired characteristic value as a function of the impulse response.

The high-frequency signal is coupled into the plasma via a probe introduced into the plasma. This probe has a probe head and a probe shaft which is connected to a signal generator for electrically coupling a high-frequency signal into the probe head. The signal generator can be constructed as an integral unit with the means for determining the impulse response. This can be realized, for example, by arranging the signal generator and a high-frequency receiver tuned to the signal generator and the associated signal evaluation electronics in a single unit, possibly even on a printed circuit board. The high-frequency receiver receives the high-frequency signals returning from the probe and converts these signals into signals having a lower frequency. These low-frequency signals, which contain the information about the impulse response, can then be digitized and subsequently digitally processed to extract the desired plasma parameters.

The probe head has a jacket and a probe core surrounded by the jacket. The surface of the probe core has mutually isolated electrode regions of opposite polarity. The probe head is constructed electrically symmetrically, wherein the probe further includes a balun arranged at the transition between the probe head and an electrically unbalanced high-frequency signal feed. The balun is provided for converting electrically unbalanced signals into balanced signals. The balun operates bidirectional.

The probe head, with its electrically symmetrical design and preferably also geometrically symmetrical design, provides an impulse response as an electrically balanced signal, or a balanced high-frequency signal is introduced into the probe head due to its electrical and possibly also geometric symmetry. However, it is not absolutely necessary to transmit the impulse response to the evaluation unit in symmetrical form. With the balun, electrically unbalanced signals can be used for signal transmission by converting the balanced signal to an unbalanced signal. The high-frequency signal feed represents electrical conductors in the form of two parallel conductors which need no longer be aligned strictly symmetrically. Phase shifts and thus unbalances may result; however, these unbalances do not affect the measurement or decoupling of the high-frequency signal into the plasma. Accordingly, the electric conductor can also be bent, thereby allowing a simplified spatially-resolved measurement of the plasma density by moving the probe, without adversely affecting the measurement results when the high-frequency signal feed is moved or bent. In other words, distortions in the measurement results arising from the geometry of the high-frequency signal feed and the transmission path are eliminated.

The electrically unbalanced high-frequency signal feed is, in particular, a shielded coaxial line, because this type of line neither radiates nor absorbs energy and therefore does not cause interferences.

Advantageously, the balun may be arranged directly at the transition to the probe head, i.e. the balanced signal from and to the probe head reaches the probe head directly and without any additional interconnected line sections. The balun is therefore preferably arranged in the probe shaft.

Attention must be paid that the transition to the high-frequency signal feed, particularly to the coaxial cable, provides a good match, i.e. a low-reflection transition. This means that the input impedance of the balun should closely match the characteristic line impedance in the coaxial line. This determines the dimensions of the high-frequency signal feed as a function of the selected substrate material. The term substrate material does not refer to the material of the conductor paths, which are in particular made of a copper material, but rather to the material of the insulating material. In other words, the electrical and geometric parameters of the conductor paths described below and of the supporting structure must be matched to the required characteristic line impedances for connecting the high frequency signal feed.

Within the context of the invention, various substrates are used, preferably by using standard printed circuit board technology. This also allows for a very cost-effective implementation, high manufacturing precision and a very good reproducibility. Epoxy-impregnated glass fiber mats (material designator FR 4) have been found to be suitable, and specifically also a base material with the designation Ro4003® (registered trademark of Rogers Corporation) representing a low-loss material specially designed for high frequencies is particularly suitable for the specific application. This is a copper-clad, ceramic-filled, glass fiber-reinforced polymer base material.

The balun thus has conductor paths which are each connected with an electrode region of the probe head. The conductor paths are located directly opposite each other. Their geometry is designed, taking into account the material properties, to produce input impedances that match the characteristic impedance of the coaxial line. The conductor paths may each have a constant width. Preferably, at least one conductor path has with respect to the other conductor path a changing width, meaning that the width of the conductor paths may increase with increasing distance from the sensor head, or alternatively may increase when approaching the probe head, such that the individual conductor paths each have a trapezoidal shape. The increase in width of one conductor path may be greater than that of the other conductor path.

In a practical embodiment, the probe head is preferably a tri-axial ellipsoid, in particular a sphere composed of two hemispheres. The hemispheres may be isolated by a central carrier plate extending through the probe core. This carrier plate may at the same time continue to the probe shaft, wherein a corresponding conductor path leading to the electrode region is arranged on each side of the carrier plate. The probe head end of the carrier plate is thus enlarged in a circular shape, whereas the probe shaft is long and narrow in comparison.

Within the context of the invention, electrical symmetry in the region of the probe is desired, which does not necessarily mean that the electrode regions of opposite polarity must be geometrically symmetrical. The spherical shape may also only be approximate. For example, the manufacturing process may require a geometry which allows for easier shaping in the molding process.

The balun may terminate directly at the electrode region of the probe head or may extend to the regions of opposite polarity into the probe head. I.e. a portion of the balun is spatially in the region of the probe head and may even extend into the center of the probe head, for example when the probe head is formed as a metallic hemisphere. The balun with the conductor paths may also be connected only to the surface of the probe head, i.e. to the electrode regions.

The central carrier plate may therefore be constructed as a circuit board from the aforementioned base materials. However, the inner electrode carrier of the probe core surrounded by the electrode regions may also be integrally formed with the carrier plate, for example as an injection molded part. The carrier plate with the molded electrode carrier can then be coated with an electrically conductive material to form the individual electrode regions of the probe core. The conductor paths may be deposited simultaneously. This production step involves in particular metallization. Preferably, a layer of copper is deposited.

The conductor paths must be shielded from the environment. Accordingly, shielding is provided at the probe shaft. The shielding may be formed of an externally metallized plastic jacket. This plastic jacket may be formed as one piece, so that the carrier plate with the conductor paths disposed thereon can be inserted in the plastic jacket.

The plastic jacket may be formed from multiple parts and cover at least the top and bottom sides of the carrier plate side facing the conductor paths. The plastic jacket itself may have a cylindrical cross-sectional shape or may be composed of cylindrical segments in the multi-part design. These cylinder segments may also cover the narrow sides that interconnect the top and bottom sides of the carrier plate. It is of course conceivable to provide the narrow sides of the carrier plate directly with shielding.

It is also possible to arrange the shielding on printed circuit boards which are in turn connected to the carrier plate. This produces a multi-layer circuit, for which different manufacturing processes are available. Ceramics such as $Al_2O_3$ or glass may also be used as carrier material for a multi-layer printed circuit board structure, to be utilized in plasmas at higher temperatures.

Regardless of whether a multi-layer printed circuit board design according to a standard printed circuit board technology is selected or whether multi-layer circuits based on sintered ceramic carriers are selected (low temperature co-fired ceramics (LTCC)), or whether the MID method is selected (MID=Molded Interconnected Devices), wherein metallic structures such as conductor paths are deposited on plastic substrates, which also enables the low-cost production of complex 3D-geometries, the probe can in particular be used for spatially resolved measurements, wherein the probe core and the shaft itself need not be directly exposed to the plasma, but may be arranged in a tube which is closed at its probe head end and serves as a dielectric. The tube serves as a jacket. The probe can be moved manually or under computer control by using a actuator for a spatially resolved measurement.

The device according to the invention is used in particular for measuring the electron density in a plasma, in particular in a low-pressure plasma. High measurement accuracy can be attained with a unique, mathematically simple evaluation rule, enabling spatially resolved and also industry-compatible measurements. With the proven probe design, the relationship between the primary measurement curve, i.e. the impulse response and the desired characteristic parameter of the plasma, can be expressed by a formula, so that the method responds only to the local electron density and not to coupling to a distant wall. Important for the measurement method is the electrically symmetrical configuration of the probe head, which, as explained above, may in particular be composed of two hemispheres, or two half-shells. The composition of the overall characteristics of the individual multipole components can be changed over a wide range by suitably designing the isolated areas and by varying the ratio of jacket to core diameter.

The structure of the probe will now be explained with reference to an example: When the radius $R_e$ of the probe core is small compared to the radius $R_d$ of the jacket, the dipole component dominates. Under the assumption in the example that the relative dielectric constant of the jacket is $\in_r=2$, that a ratio of inner to outer radius of the probe $R_e/R_d=0.5$ is selected, and that the thickness δ of the plasma boundary layer surrounding the probe is small compared to $R_d$, the resonant frequency $\omega_{res}$ for this specific case can be calculated from the following equation:

$$\omega_{res}^2 \approx 0.583\omega_p^2.$$

$\omega_p$ is here the local plasma frequency of the plasma which is in fixed relationship to the electron density $n_e$. Solving for the electron density yields:

$$n_e \approx 2.1 f_{GHZ}^2 \times 10^{10}\ \mathrm{cm}^{-3}.$$

This relatively simple and especially unambiguous evaluation rule, which is adapted to respective ellipsoidal and in particular spherical probe shape, allows a highly accurate determination of the local plasma density.

The so-called multipole resonant probe is suitable not only for measuring the plasma density, but also for measuring the electron temperature and the collision rate, i.e. the collision frequency, in low-pressure plasmas.

BRIEF DESCRIPTION OF THE DRAWING

The invention will now be described with reference to exemplary embodiments illustrated in the drawings, which show in.

DETAILED DESCRIPTION OF PREFERRED EMBODIMENTS

Figure 1:
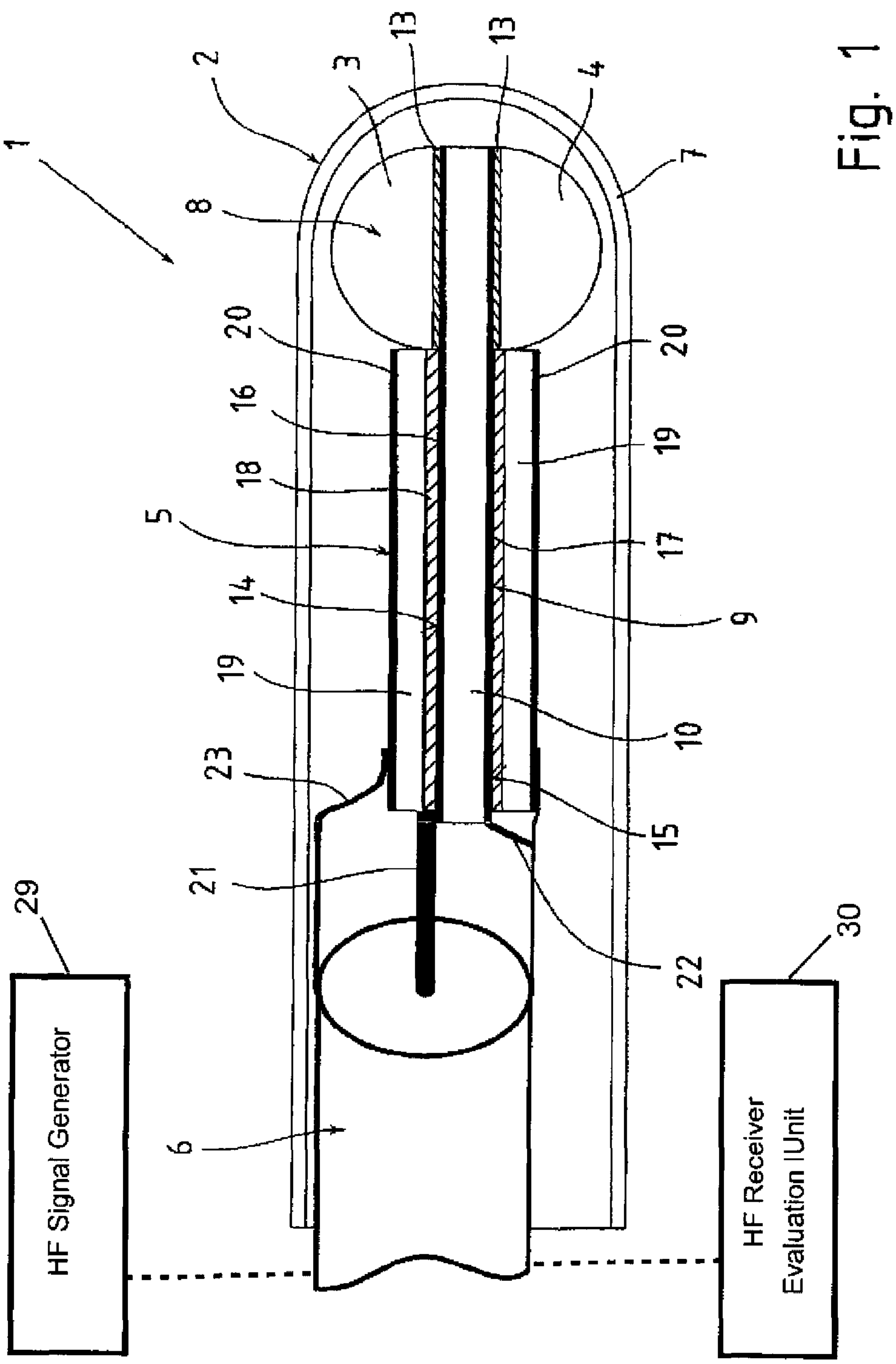
FIG. 1 a basic diagram of a probe in a first exemplary embodiment.

FIG. 1 shows a perspective view of the structure of a device for measuring the density and/or the electron temperature and/or the collision rate of a plasma. Shown here is a first probe insertable into the plasma. The probe 1 has at its free end a probe head 2, with a probe core 8, which is composed of two hemispherical electrode regions 3, 4. The probe core 8 is electrically symmetrical. The probe core 8 is supported by a probe shaft 5, which in a practical embodiment is long and slender. A high-frequency signal feed 6 in the form of a coaxial cable is connected to the probe shaft 5. The high-frequency signal feed 6 is connected to means 29, for example to a signal generator 29, for coupling a radio frequency signal. Moreover, means 30, for example a receiver 30, for determining the impulse response, in particular the resonant frequency to the high-frequency signal coupled into the plasma are provided as well as an evaluation unit for computing the desired characteristic values of the plasma as a function of the impulse response according to a predetermined evaluation rule. The evaluation rule which is matched to the spherical probe permits, in particular, a determination of the local plasma density with high accuracy. The probe core 8 is housed in a quartz tube closed at one end, which forms a jacket 7. Radii of the probe core 8 and the jacket 7, in relation to the center of the probe core 8, are important factors for measuring the electron density of a plasma. The jacket 7 together with the probe core 8 forms the probe head 2 of the probe 1 as a functional unit. In other words, in this embodiment, the jacket 7 is a component of the probe 1.

Within the context of the invention, the configuration of the probe shaft 5 and of the high-frequency signal feed 6 is essential. An electrically unbalanced signal is introduced into the probe shaft 5 by the high-frequency signal feed 6. This electrically unbalanced signal is converted to a balanced signal and vice versa inside the probe shaft 5. The probe shaft 5 therefore has a balun 9.

Figure 2:
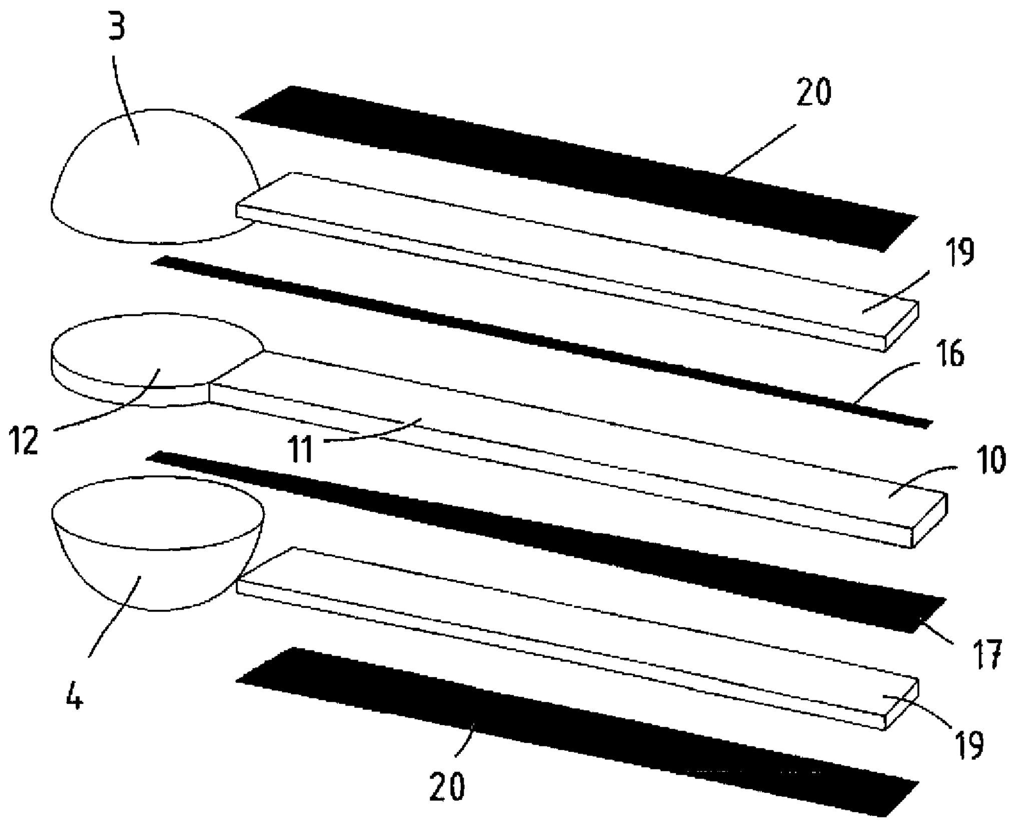
FIG. 2 an exploded view of the embodiment of a probe according to FIG. 1.

The probe shaft 5 is configured as multilayer arrangement. There is a central carrier plate 10, as can be seen in the representation of FIG. 2. The carrier plate 10 has an elongated rectangular shaft 11 and an end piece 12 shaped as a circular disk with a diameter that matches the diameter of the two hemispherical electrode portions 3, 4 of the probe core 2. The carrier plate 10 is composed of a base material for printed circuit boards, such as FR4 or Ro4003®. The thickness is preferably 200 μm. The two electrode portions 3, 4 are connected with the end piece 12 by a solder or an electrically conductive adhesive 13. A corresponding conductor path 16, 17 disposed on each of the top surface and the bottom surface 14, 15 of the central carrier plate 10 is simultaneously brought into contact with the semi-spherical electrode portions 3, 4.

Figure 3:
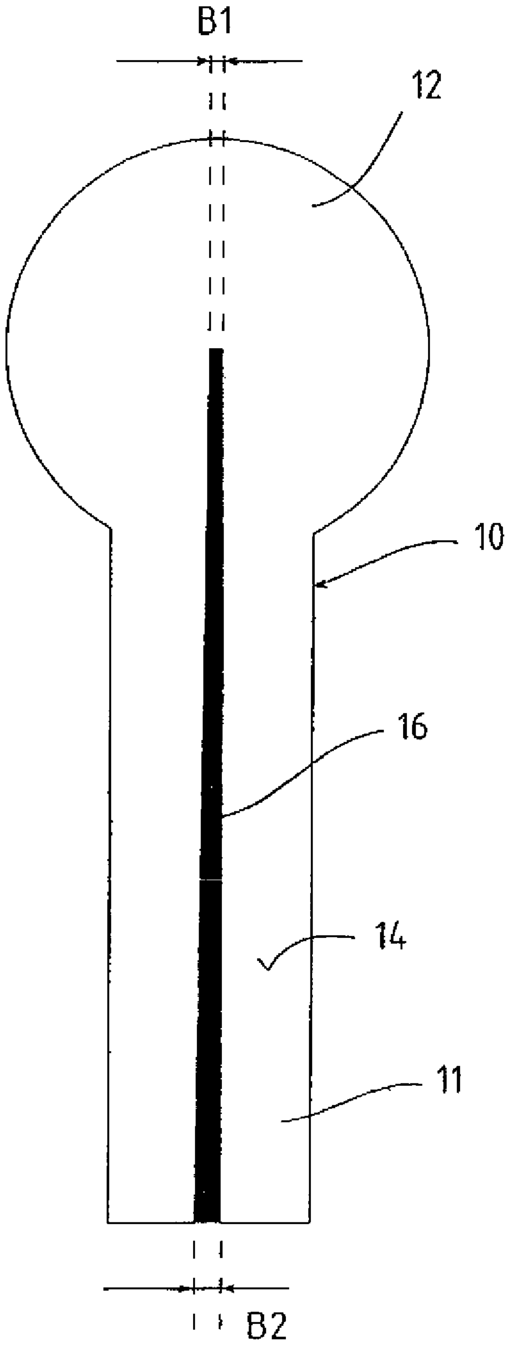
FIG. 3 a plan view of an upper conductor path of the balun of FIG. 2.
Figure 4:
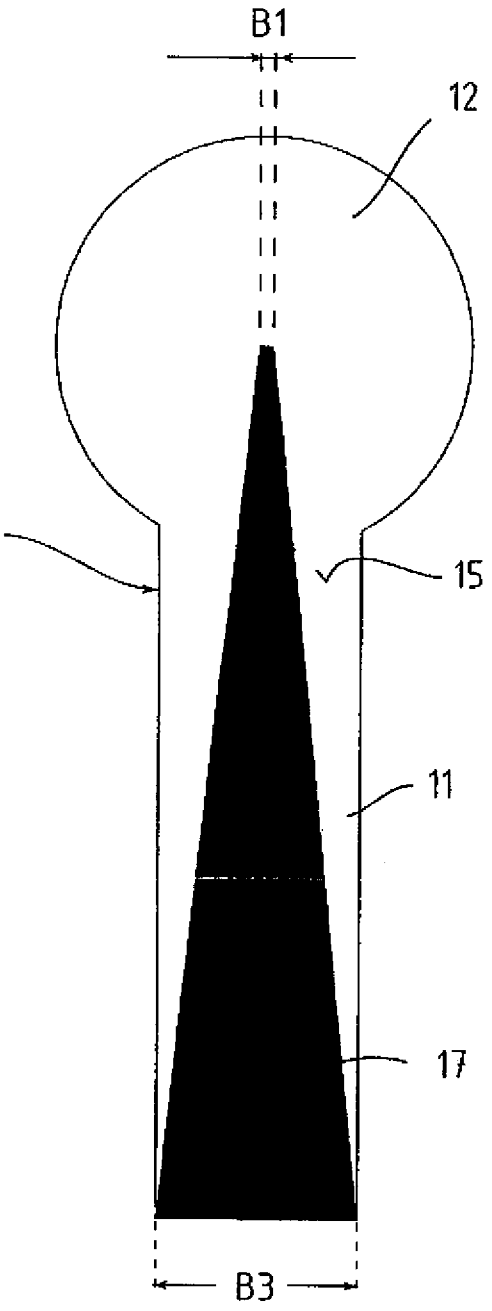
FIG. 4 a plan view of a lower conductor path of the balun of FIG. 2.

The exact configuration of these two conductor paths 16, 17 is shown in FIGS. 3 and 4. The conductor paths 16, 17 are made of a copper material and have preferably a thickness of 17 μm. The conductor paths 16, 17 extend, where appropriate, to the center of the end piece 12 and thus to the middle of the circular surfaces of the electrode regions 3, 4

The top layer in the image plane of FIG. 2 has a width B1 of 0.2 mm in its initial region below the third electrode region 3. The other end of the carrier plate 10 has in this embodiment a width B2 of 0.4 mm. The ratio of B1:B2 is therefore 1:2

The opposing conductor path 17 also starts at the center of the circular end piece 12. It has also an initial width B1 of 0.2 mm. However, the width B1 of the conductor path 17 increases much more strongly to the end of the shaft 11, namely to a value of 2.90 mm. This corresponds in this particular embodiment to the overall width of the shaft 11. The ratio of B1 to the final width B3 is in this embodiment 1:14.5.

In the embodiment of FIG. 1, a further layer made of a prepreg 18 having a thickness of 150 μm is located above the conductor paths 16, 17. The prepregs 18 serve as a bonding layer between two printed circuit boards. The prepregs 18 are omitted in FIG. 2. In the layered structure, another printed circuit board 19 follows each of the conductor paths 16, 17. The printed circuit boards 19 are configured identically and carry each a shielding 20 having a thickness of 17 μm. The shielding 20 is made of a copper material. The printed circuit board 19 is once more made of Ro4003®.

As shown in FIG. 1, the high-frequency signal feed 6 in the form of a coaxial cable is connected with its inner conductor 21 to the upper conductor path 16 in drawing the plane, while the outer conductor 22 is connected to the opposite conductor path 17. A shielding 23 of the coaxial cable is connected to the shielding 20 in the region of the probe shaft 5.

Figure 5:
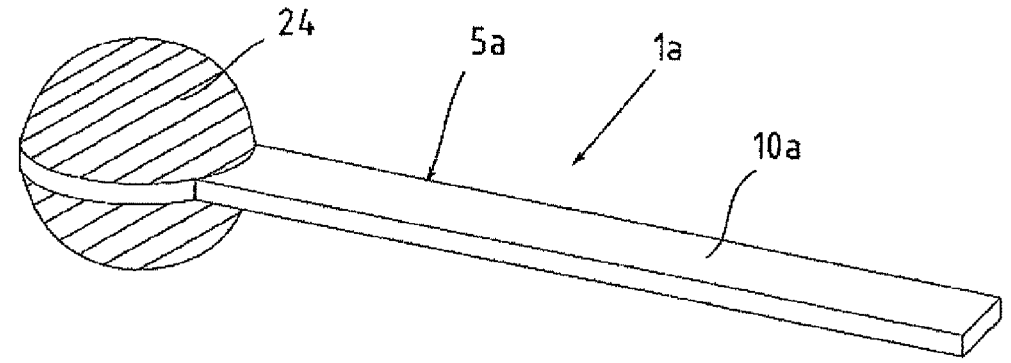
FIG. 5 a perspective view of a carrier plate made of plastic with a molded electrode carrier.
Figure 6:
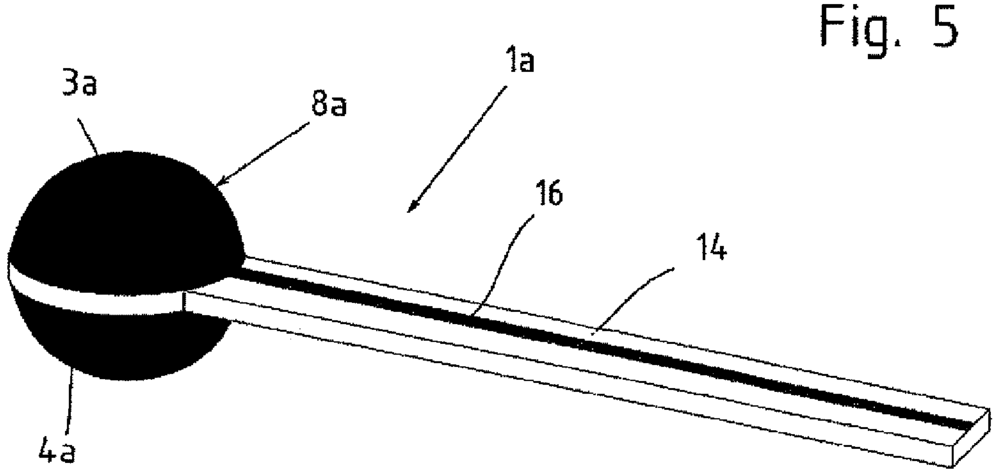
FIG. 6 the carrier plate of FIG. 5 following metallization of the top side and of the electrode carrier.
Figure 7:
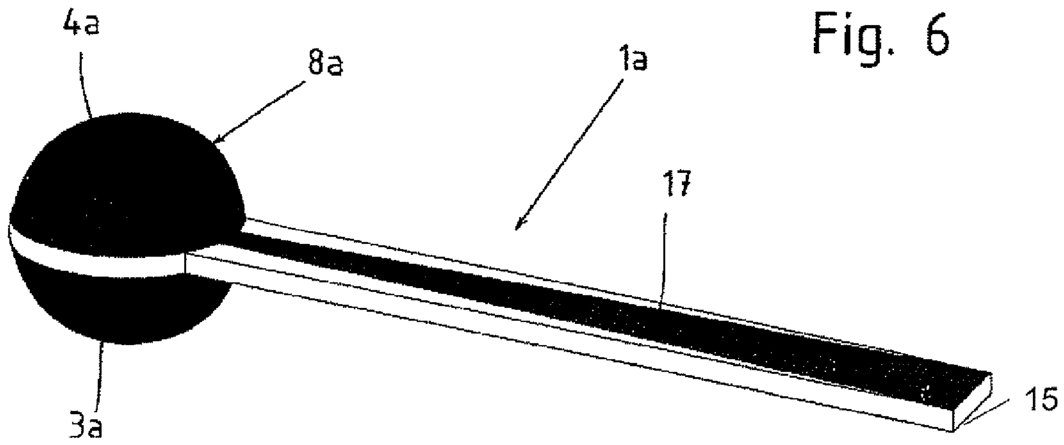
FIG. 7 the carrier plate of the FIGS. 5 and 6 following metallization of the bottom side, as viewed in the direction of the bottom side.

FIGS. 5 to 7 show an alternative manufacturing process of an inventive probe 1*a*. The metallic structures are here applied on a plastic carrier, which is formed for example by injection molding. FIG. 5 therefore shows a blank for the inventive probe 1*a*, composed of a carrier plate 10*a*, on which a spherical electrode carrier molded 24 is overmolded as one piece. The electrode carrier 24 can be overmolded in a separate process step. Preferably, the electrode carrier 24 and the carrier plate 10*a* are produced in a single manufacturing step. The electrode carrier 24 and the carrier plate 10*a* are metallized at the next step, where the hemispherical electrode regions 3*a*, 4*a* and the conductor paths 16 described in the first embodiment (FIG. 6) and 17 (FIG. 7) are formed.

Such a probe 1*a* and carrier plate 10*a* with the electrode carrier 24 can be produced at very low cost. A shielding 20*a*, 20*b* is relatively easy to implement, as clearly illustrated in FIGS. 8 and 9.

Figure 8:
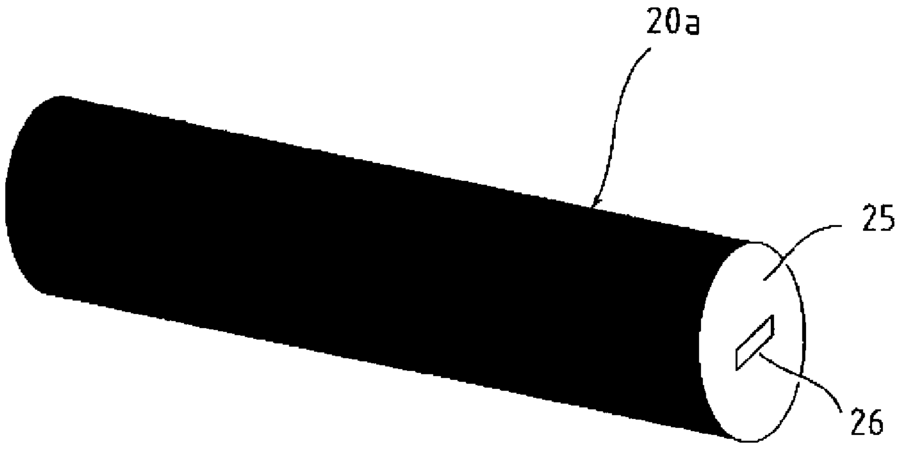
FIG. 8 an externally metallized plastic jacket as shielding for a probe according to the design of FIGS. 5 to 7.

FIG. 8 shows an externally metallized cylindrical plastic jacket 25. The shielding 20 formed in the embodiment of FIG. 1 from two separate layers of copper is here formed by a shielding 20*a* in the form of a coated cylinder. The plastic jacket 25 has a recess 26 into which the shaft 5*a* of the probe 1*a* illustrated in FIGS. 5 to 7 can be inserted.

Figure 9:
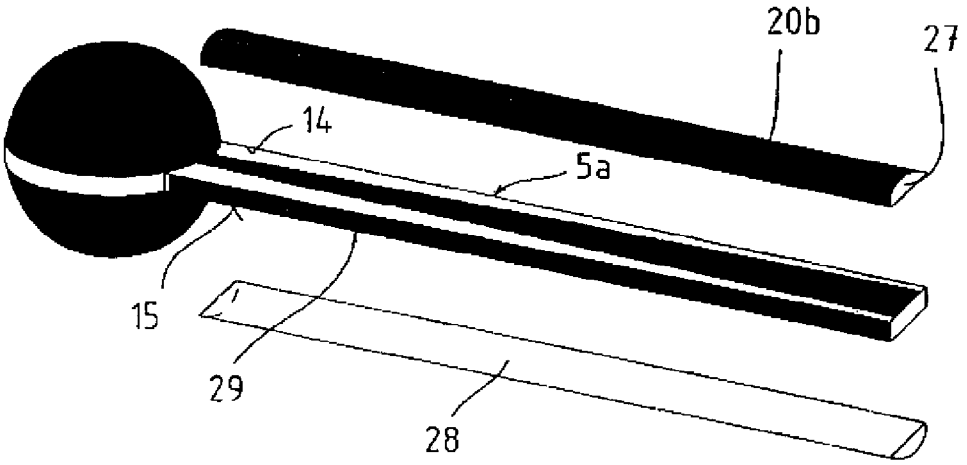
FIG. 9 another embodiment of a shielding for a probe.

FIG. 9 shows a second option for shielding. Similar to the embodiment of FIG. 8, shieldings 20*b* with curved surfaces are used. In this exemplary embodiment, the curved surfaces have the shape of the cylindrical portion or cylinder segment. The two plastic sleeves 27, 28 metallized on their curved surfaces are attached to the top surface 14 or the bottom surface 15 of the shaft 5*a*. Additionally, a metallization is located on the narrow sides 29 of the shaft 5*a*, which in the assembled state with the sleeves 27, 28 also forms a closed shielding 20*b*, as is also the case 8 in the embodiment of FIG. 8.

The invention claimed is:

1. A device for measuring at least one of density, electron temperature and collision frequency of a plasma, comprising:

a probe for insertion into the plasma, the probe comprising:

a probe head comprising a probe core having mutually isolated electrode regions of opposite polarity and a jacket surrounding the probe core, a balun disposed at a transition between the probe head and an electrically unbalanced high-frequency signal feed, said balun converting electrically unbalanced signals into balanced signals, and the device further comprising:

a signal generator connected to the probe shaft and electrically coupling a high-frequency signal into the probe head, and a receiver configured to determine an impulse response to the high-frequency signal coupled by the probe head into the plasma and to calculate from the impulse response the at least one of density, electron temperature and collision frequency of the plasma, wherein the probe comprises a central carrier plate extending through the probe core and the probe shaft, wherein an electrode region of the probe core and a corresponding conductor path associated with the corresponding electrode region are arranged on respective sides of the carrier plate in one-to-one correspondence.

2. The device of claim 1, wherein the signal generator is connected to the probe shaft an electrically unbalanced line.

3. The device of claim 1, wherein the electrically unbalanced high-frequency signal feed is connected to a coaxial cable.

4. The device of claim 1, wherein the balun is arranged inside the probe shaft.

5. The device of claim 1, wherein the balun has an input impedance that corresponds to a characteristic line impedance of the electrically unbalanced high-frequency signal feed.

6. The device of claim 1, wherein the balun comprises conductor paths arranged in direct opposition to each other, with each conductor path being connected to a corresponding electrode region of the probe core.

7. The device of claim 6, wherein at least one of the conductor paths has a width that varies in relation to a width of another conductor path.

8. The device of claim 1, wherein the balun extends into a region between the electrode regions of the probe core.

9. The device of claim 1, wherein the electrode regions enclose an electrode carrier constructed as an integral component of the carrier plate.

10. The device of claim 1, wherein the electrode carrier is electrically non-conductive and the electrode regions comprise an electrically conductive material disposed on the electrode carrier, and wherein the carrier plate is electrically non-conductive and conductor paths comprise an electrically conductive material disposed on the carrier plate.

11. The device of claim 6, wherein the probe shaft comprises shielding arranged on the probe shaft and spaced from the conductor paths.

12. The device of claim 11, wherein the shielding comprises an externally metallized plastic jacket.

13. The device of claim 12, wherein the plastic jacket is constructed as a single piece an configured for insertion of the carrier plate in the plastic jacket.

14. The device of claim 12, wherein the plastic jacket is constructed in several parts and covers at least top sides and bottom sides of the carrier plate facing the conductor paths.

15. The device of claim 12, further comprising a printed circuit board connected with the carrier plate, wherein the shielding is disposed on the printed circuit based.

16. The device of claim 1, wherein the probe comprises a multi-layer circuit based on sintered ceramic carriers.

17. The device of claim 1, wherein the jacket is constructed as a tube made of a dielectric and is closed at an end facing the probe head.

* * * * *